US005577067A

United States Patent [19]

Zimmerman

[11] Patent Number: 5,577,067
[45] Date of Patent: Nov. 19, 1996

[54] DATA ACQUISITION AND STORAGE SYSTEM FOR TELECOMMUNICATION EQUIPMENT TO FACILITATE ALIGNMENT AND REALIGNMENT OF THE TELECOMMUNICATIONS EQUIPMENT

[75] Inventor: Dennis A. Zimmerman, Rockingham County, Va.

[73] Assignee: ComSonics, Inc., Harrisonburg, Va.

[21] Appl. No.: 199,874

[22] Filed: Feb. 22, 1994

[51] Int. Cl.⁶ .................. H04B 3/46; G06F 11/00
[52] U.S. Cl. .............. 375/224; 375/228; 371/20.4; 371/21.4; 395/183.22
[58] Field of Search .................. 375/334, 335, 375/336, 224, 228, 257; 329/300, 302, 303; 370/17; 364/481; 371/18, 21.2, 15.1, 20.4, 21.2, 21.3, 21.4; 395/183.06; 360/63, 67

[56] References Cited

U.S. PATENT DOCUMENTS

| | | | |
|---|---|---|---|
| 3,544,894 | 12/1970 | Hartwell et al. | 324/77 |
| 4,264,958 | 4/1981 | Rowell, Jr. et al. | 364/485 |
| 4,685,065 | 8/1987 | Braun et al. | 364/485 |
| 4,700,222 | 10/1987 | Large et al. | 358/86 |
| 4,812,996 | 3/1989 | Stubbs | 364/487 |
| 4,907,231 | 3/1990 | Watanabe et al. | 371/24 |
| 4,970,648 | 11/1990 | Capots | 364/424.06 |
| 5,072,168 | 12/1991 | Ferguson | 324/77 B |
| 5,107,207 | 4/1992 | Nayori | 324/158 R |
| 5,410,686 | 4/1995 | Kish | 395/575 |
| 5,469,443 | 11/1995 | Saxena | 371/21.3 |
| 5,475,814 | 12/1995 | Tomimitsu | 395/183.06 |

Primary Examiner—Kim Vu
Assistant Examiner—Madeleine Anh-Vinh Nguyen
Attorney, Agent, or Firm—Whitham, Curtis, Whitham & McGinn

[57] ABSTRACT

A data acquisition and transceiver module is used to acquire data from diagnostic equipment, such as a portable sampling spectrum analyzer. This data is then transmitted to a slave transceiver and storage module where it is stored in memory. The slave transceiver and storage module is typically housed remotely from the diagnostic equipment in the telecommunications electronic equipment and serves as an archival resource for set-up and maintenance parameters.

9 Claims, 6 Drawing Sheets

DATA ACQUISITION AND STORAGE SYSTEM FOR TELECOMMUNICATION EQUIPMENT TO FACILITATE ALIGNMENT AND REALIGNMENT OF THE TELECOMMUNICATIONS EQUIPMENT

BACKGROUND OF THE INVENTION

1. Field of the Invention

The present invention generally relates to telecommunication systems and, more particularly, to a portable, two-part electronic data acquisition and storage system used in the field to facilitate alignment and realignment of telecommunications equipment.

2. Description of the Prior Art

In a point-to-multipoint telecommunication system such as a CATV system, there are many tree configuration circuits, inclusive of trunk and branch parts each containing multiple amplifiers. Such systems are complex to install and maintain due to the fact that there are many active circuits which can effect the overall performance of the system. Moreover, the coaxial cables generally employed in these systems are lossey, subject to temperature variations and must be properly terminated to avoid standing waves, all of which have a contributing effect on the performance of individual amplifiers in the system.

The initial installation of the system requires that each amplifier in the system be tuned to achieve system balance. Thereafter, it is necessary to routinely check each amplifier in the field and retune where necessary to maintain system balance. When an amplifier fails, the installation of a replacement amplifier requires that this amplifier be tuned to again achieve system balance.

More particularly, the goal of a CATV system is to deliver to customers the same signal level for, say, channel 2 as for channel 13; however, this type of signal delivery is not possible over the entire frequency spectrum of the system and, therefore, tuning is a matter of optimizing performance over the cable bandwidth for each individual amplifier. While a number of contaminants accumulate to impair visual acuity of delivered pictures, there are primarily two limiting factors which must be considered in the design and maintenance of amplifiers in a CATV system. If too much output level is demanded, cumulative third order intermodulation distortion becomes excessive on any given channel. On the other hand, if amplifier gain is too low, the signal level for some channels will be too low for succeeding amplifiers resulting in increased channel noise levels.

Both carrier-to-intermodulation and carrier-to-noise ratios can be observed by a spectrum analyzer. The intermodulation test is for beat frequencies caused by three frequencies, thus producing third-order distortion. Systems with high channel counts continuously battle to control the cumulative third order intermodulation or composite triple beat. Also, the nonlinearity portion of the amplifier's transfer function produces crossmodulation and composite triple beats and also causes intermodulation distortion. Use of the spectrum analyzer to locate and measure these beats, which are located close to video carriers, is a simple task in that the spectrum analyzer is simply connected to the system at sufficient signal level. Likewise, in order to measure carrier-to-noise ratio, the spectrum analyzer can be connected at almost any system test point, provided that there is enough system signal level. Essentially, a test carrier that has no other carrier on either side of it is needed. The carrier is selected by the analyzer center frequency control and the span adjusted to cover this one channel and the adjacent vacant channel. Once the carrier has been measured, the center frequency is adjusted to avoid sideband energy and the video filter contained in the spectrum analyzer is placed in the 300 Hz position. The noise is averaged by the filter, thus raising the baseline in the vacant carrier area. Reading the noise measurement to where the raised baseline intersects the screen graticule and comparing this result with the previously determined carrier amplitude provides a measure of the carrier-to-noise (C/N) ratio.

While these test procedures are in themselves relatively simple to make in a laboratory, they must be made in the field for each of the amplifiers in the system on original installation and periodically thereafter to maintain the system in optimum condition.

SUMMARY OF THE INVENTION

It is therefore an object of the present invention to provide an apparatus and a method for automating in the field the alignment and realignment of telecommunications equipment.

It is another object of the invention to provide an apparatus and a method for tuning of amplifiers in a telecommunications system, such as a cable communication system, in order to significantly reduce the costs of maintenance of the system.

It is a further object of the invention to provide an apparatus and a method establishing prealignment characteristics of amplifiers in a telecommunications system depending on the location of the amplifiers in the system.

It is yet another object of the invention to provide an apparatus and method of making practical universal standard alignment characterization of amplifying devices used to construct a telecommunication system to simplify the alignment task.

According to a preferred embodiment of the invention, a data acquisition and transceiver module is used to acquire data from diagnostic equipment, such as a portable sampling spectrum analyzer. This data is then transmitted to a slave transceiver and storage module where it is stored in memory. The slave transceiver and storage module may be housed in the telecommunications electronic equipment and serves as an archival resource for how the equipment is to be set up and maintained. Alternatively, the storage module may be part of a centrally located file server accessed via modem or cellular telephone.

In a specific implementation of the invention, the slave transceiver and storage module is housed in the amplifier of a cable communications system, such as a CATV system. Amplitude versus frequency data unique to a particular amplifier located in the system is downloaded from the data acquisition and transceiver module to the slave transceiver and storage module and stored. The stored sweep data is then available to facilitate periodic amplifier adjustments or for setting up a replacement amplifier should the original amplifier fail.

The preferred embodiment of the invention is particularly adapted to be used with a portable sampling spectrum analyzer as described in U.S. Pat. No. 4,685,065 to Braun et al.; however, other data acquisition devices such as spectrum analyzers and signal level meters could be used in the practice of the invention. The archived data is read out of the slave transceiver and storage module and displayed as a difference (or delta) with the actual data read from the amplifier. Normalizing the data in this manner makes tuning simply a matter of adjustment until the display on the instrument shows a straight line indicating that the delta has been reduced to zero.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
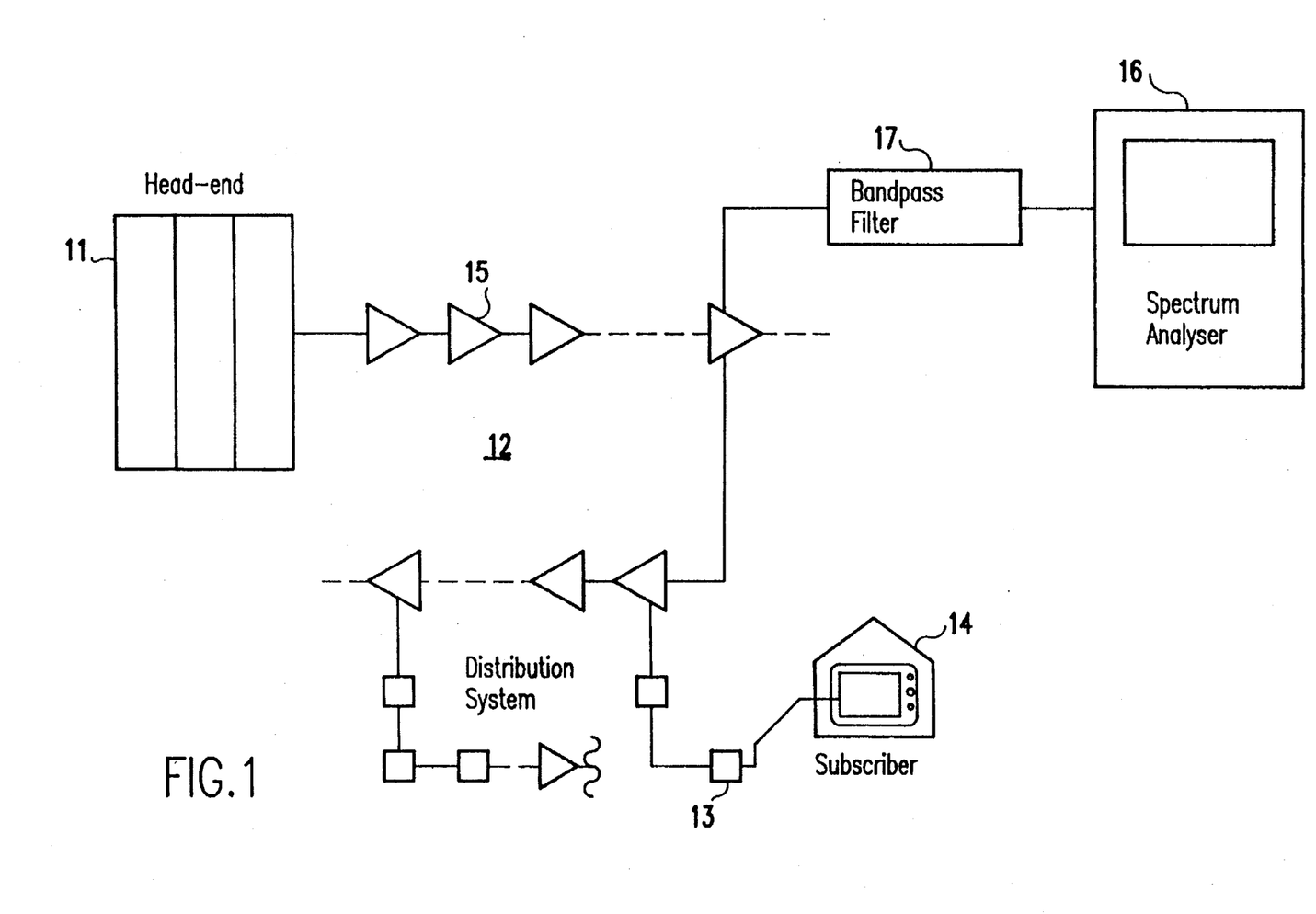
FIG. 1 is a simplified block diagram of a CATV system in which a spectrum analyzer is connected for making intermodulation and carrier-to-noise ratio measurements on one of the amplifiers in the system.

Referring now to the drawings, and more particularly to FIG. 1, there is shown, in simplified form, a CATV system 10 having a head-end 11, a distribution system comprising a string of amplifiers 12, some of which are bridging amplifiers with multiple feed ports, and multiple taps or splitters 13 which connect to individual subscribers, represented by a subscriber 14. The main trunk, comprising amplifiers 15, have amplifiers spaced roughly equal distances so as to compensate for signal losses in the intervening cable. However, due to greater losses in coaxial cable to the higher frequencies, the amplifiers closer to the head-end are adjusted to have a gain characteristic "tilted" for higher gains at higher frequencies in order to compensate for those losses. This is accomplished by adjusting an equalizer (not shown) preceding the amplifier. Such equalizers are typically part of the amplifier module. Some of the amplifiers in the main trunk are provided with taps for connection to branch trunks. A branch trunk, comprising amplifiers 12, also have amplifiers spaced roughly equal distances so as to compensate for signal losses in the intervening cable, and these amplifiers have taps for connection to subscribers, such as subscriber 14. The gain characteristic of these amplifiers may now need to be "tilted" for higher gains at lower frequencies so that at the subscriber, an approximately uniform gain across the spectrum is delivered.

Practical CATV systems are considerably more complex than the diagram of FIG. 1 indicates and may have one or more hubs between the head-end and the subscribers. Moreover, some of the newer installations may use different media; that is, the main trunk may comprise fiber optic cable, but the branch trunk may use copper coaxial cable. The point here is to show a specific, nonlimiting application of the invention in a typical telecommunications system.

As mentioned above, the gain characteristics of the amplifiers in the system shown in FIG. 1 need to be adjusted on original installation of the system in order to properly balance and align the system. Thereafter, it is necessary to check and readjust, where necessary, the gain characteristics of the amplifiers in the system to maintain the balance and alignment of the system. Occasionally, it is necessary to replace an amplifier which, in turn, requires that the replacement amplifier be "tuned" to provide the required balance and alignment of the system. This is typically accomplished by connecting a spectrum analyzer 16 to an amplifier via a bandpass filter 17. Measurements are made, and the amplifier's equalizer is adjusted as necessary. This process, however, requires highly trained field technicians.

Figure 2:
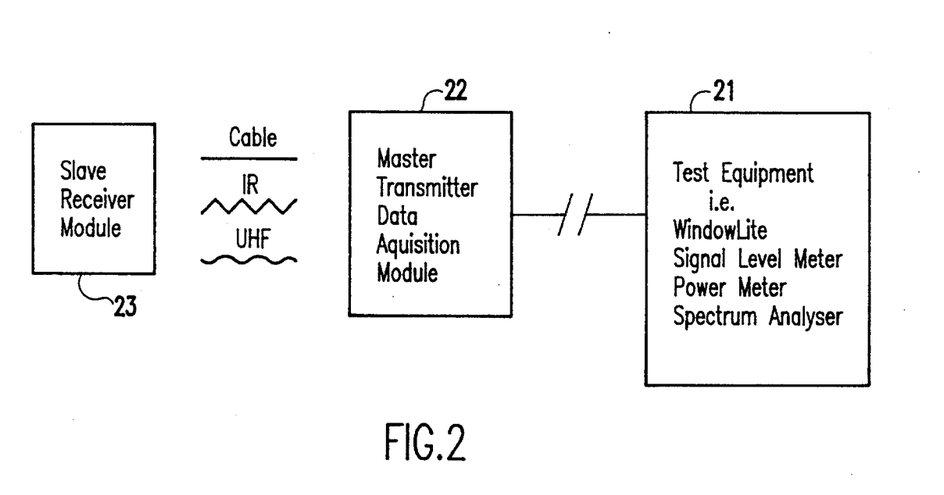
FIG. 2 is a generalized block diagram of the electronic data acquisition and storage system according to the invention illustrating how it interfaces with test equipment used in the set up and maintenance of a telecommunications system such as the CATV system shown in FIG. 1.

FIG. 2 shows the basic components of a specific implementation of a preferred embodiment of the invention. Test equipment 21, for example a portable sampling spectrum analyzer such as the Window® Lite Plus product sold by ComSonics, Inc., of Harrisonburg, Va., is connected to a master transceiver and data acquisition module 22. The basic design of the Window® Lite Plus product is described in U.S. Pat. No. 4,685,065 to Warren L. Braun et al. It includes a microprocessor which may be controlled by various firmware modules, and in the practice of this implementation of the invention, the microprocessor is controlled by a firmware module which causes the microprocessor to provide a differential, or delta, display, as described in more detail hereinafter. The Window® Lite Plus product features a modular construction which permits various modules to be attached to the back of the device, providing electrical connection as well as personality instructions specific to the application or function. One of these modules is the master transceiver and data acquisition module 22. The connection between this module and the sampling spectrum analyzer 21 is essentially an extension of the internal bus of the sampling spectrum analyzer. The master transceiver and data acquisition module 22 in this implementation typically comprises an encoder/decoder, a Universal Asynchronous Receiver and Transmitter (UART) and line drivers. The master transceiver and data acquisition module 22 communicates with a slave transceiver and data storage module 23 via any convenient communications link, including but not limited to a pluggable wired cable or an infrared (IR) or a radio frequency (RF) link. The slave transceiver and data storage module 23 is housed within the telecommunications active equipment, such as an amplifier in a cable communications system, and therefore should be as small as possible. Power for the slave transceiver and data storage module 23 is preferably provided by the master transceiver and data acquisition module 22 but optionally could be supplied by the telecommunications equipment. Ordinarily, no power is required for the slave transceiver and storage module 23 except when data is being written to or read from the module. The principle component of the slave transceiver and data storage module 23 is a nonvolatile memory, such as an Electronically Erasable and Programmable Read Only Memory ($E^2$PROM). In its simplest form, the slave transceiver and data storage module 23 may comprise only the $E^2$PROM and a wired modular telephone connection (RJ-11).

Figure 3:
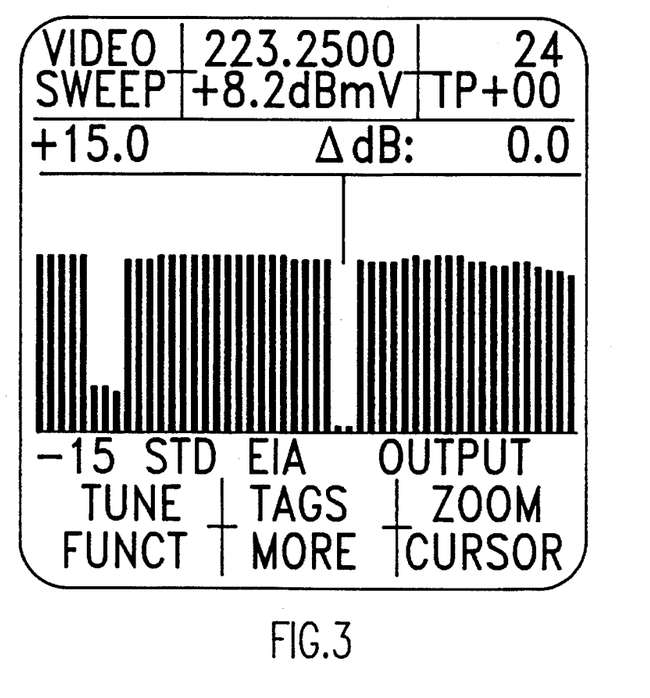
FIG. 3 is a pictorial illustration of the display of a portable sampling spectrum analyzer which may be used in the electronic data acquisition and storage system shown in FIG. 2.

Referring now to FIG. 3 there is depicted the display of the Window® Lite Plus portable sampling spectrum analyzer in the sweep mode. This mode features a bar graph display showing the full spectrum of channels on a CATV system, enabling the user to view amplitude versus frequency response at a single glance. In addition to the bar graph display, there are alphanumeric displays indicating, among other things, the selected mode, ideal frequency and channel designation, and CNR hum.

Figure 4A:
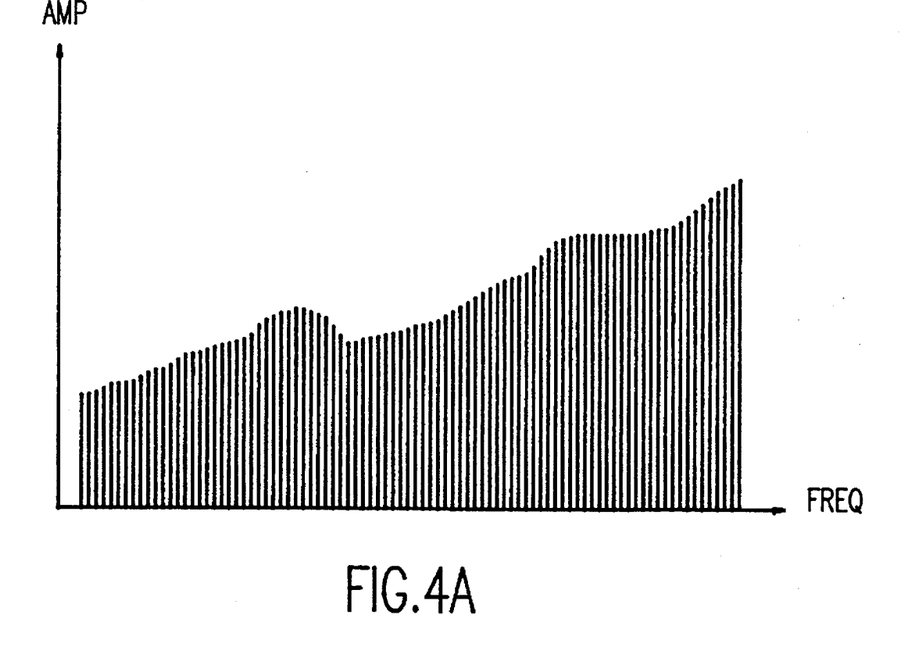
FIGS. 4A to 4C illustrate the bar graph portions of the display shown in FIG. 3 illustrating the "tilting" of the pass band responses of amplifiers in a balanced and aligned system depending on the locations of the amplifiers in the system.
Figure 4B:
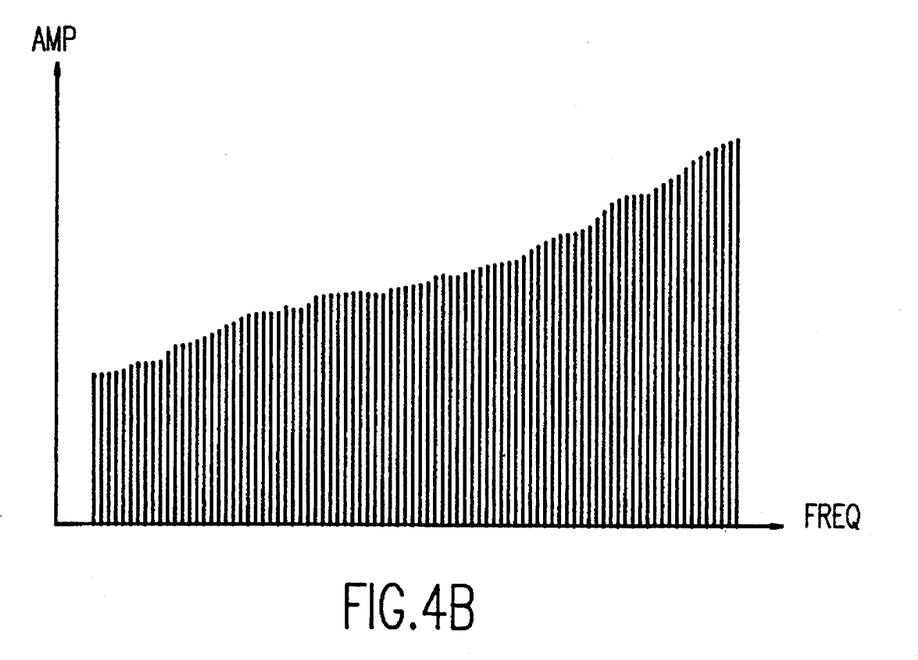
Figure 4C:
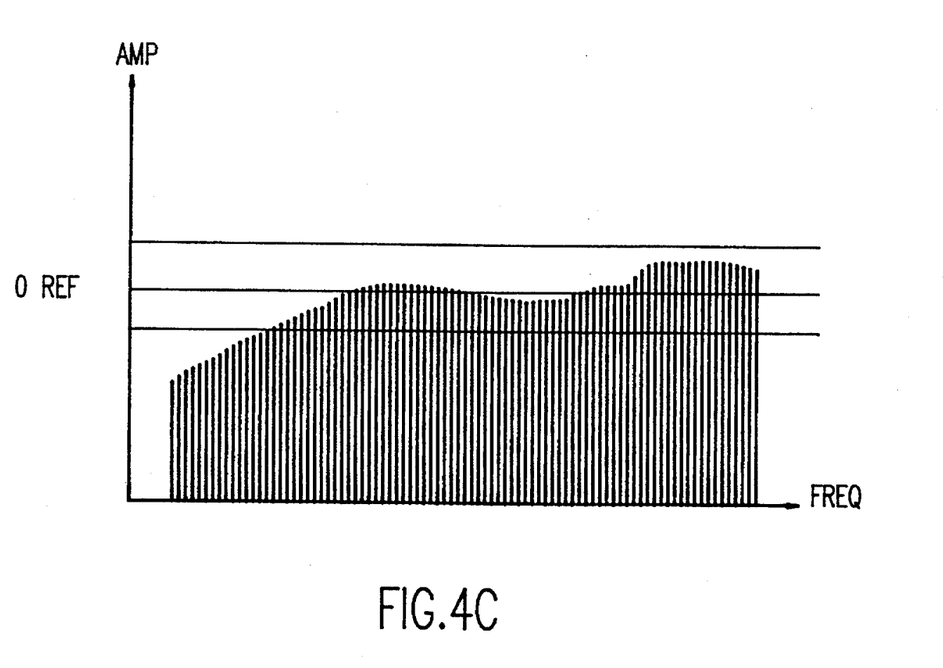

FIGS. 4A to 4C show typical amplitude versus frequency responses for an amplifier in the CATV system shown in FIG. 1 in order to illustrate the tuning process facilitated by the invention. FIG. 4A is a "snapshot" of an actual sweep showing a "tilt" in the response providing a higher gain at higher frequencies, whereas FIG. 4B is a snapshot of the desired sweep for the amplifier as stored in slave transceiver and data storage module. FIG. 4C is a snapshot of the "delta" display showing the difference between the actual sweep shown in FIG. 4A and the desired sweep shown in FIG. 4B. The purpose of these figures is simply to provide an illustrative example of the "tuning" required of individual amplifiers in the system in order to achieve a balanced and aligned telecommunications system. Clearly, the effort to achieve this condition initially and to maintain the system in a balanced and aligned condition is considerable using conventional measurement techniques.

Using the teaching of the invention, data for the proper tuning of an electronic equipment of the system is stored in the slave transceiver and data storage module 23. Preferably, this data may be preloaded and comprise initial, default values according to where the component is to be located in the system. In the practice of a preferred implementation of the invention, this data is read out of the nonvolatile memory in the slave transceiver and data storage module 23 and displayed. This display then represents the stored values which might be written to the nonvolatile memory at the time the telecommunications system is initially balanced and aligned or as initial default values. In any case, in the practice of this implementation of the invention, the sampling spectrum analyzer 21 is provided with a differential, or delta, mode which displays the difference between the actual measured values and the stored values. This display is shown in FIG. 4C. Using this display, it is simply a matter of adjusting the telecommunications component, in this case an amplifier, to null the delta; that is, adjusting the equalizer until the display on the instrument shows a relatively straight line indicating that the delta has been reduced to zero or is within predetermined limits.

Figure 5:
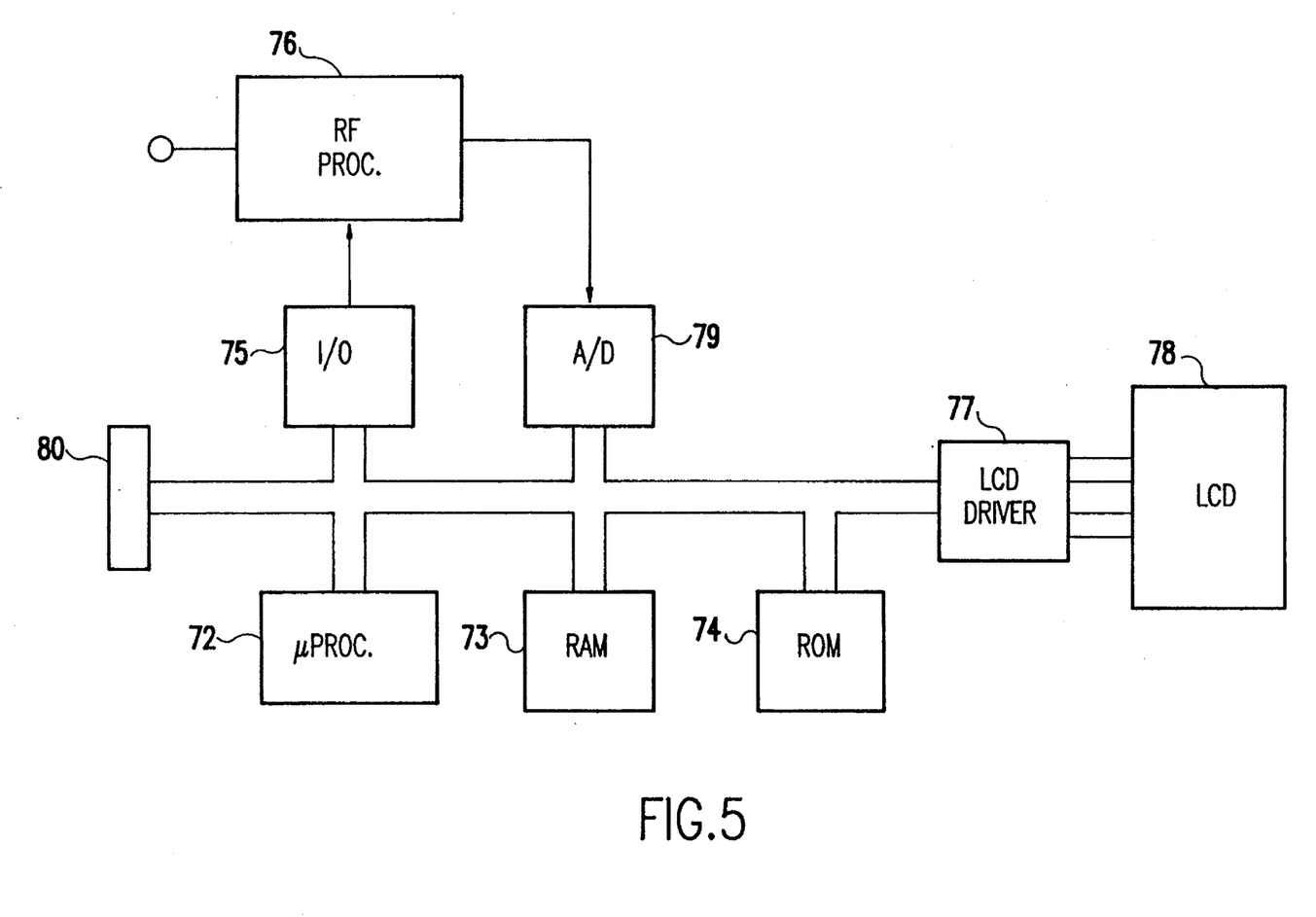
FIG. 5 is a block diagram of the principle components of the portable sampling spectrum analyzer used in the data acquisition and storage system shown in FIG. 2.

FIG. 5 shows a simplified block diagram of the sampling spectrum analyzer 21. This device has a bus 71 to which is connected a microprocessor 72, various memory devices, including Random Access Memory (RAM) 73 and Read Only Memory (ROM) 74, Input/Output (I/O) device 75 controlling RF signal processor 76, and display driver 77 controlling the Liquid Crystal Display (LCD) 78. In addition, the output of RF signal processor 76 is coupled via Analog-to-Digital (A/D) converter 79 to the bus 71 so that measured data may be both displayed on LCD 78 and stored in RAM 73. The details and operation of the sampling spectrum analyzer 21 will not be described here, and the reader is referred to the Braun et al. patent, supra, for a more complete description. It will, of course, be understood at the same time that this part of the implementation may be realized with other electronic test equipment. Moreover, it is not even necessary that the test equipment used be microprocessor based, although most modern test equipment typically includes a microprocessor based system.

Figure 6:
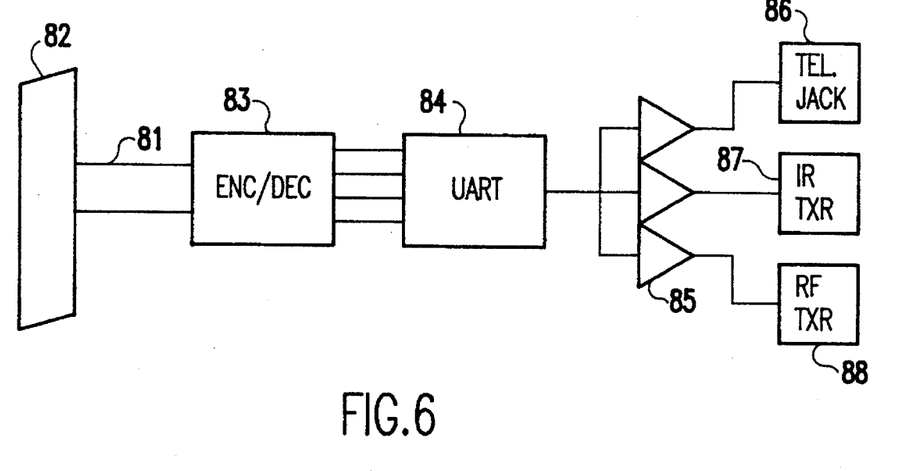
FIG. 6 is a block diagram of the master transceiver module used in the data acquisition and storage system shown in FIG. 2.

The sampling spectrum analyzer 21 includes an external bus port 80, shown in FIG. 5, to which the master transceiver and data acquisition module 22 is connected. As mentioned above, the Window® Lite Plus product manufactured by ComSonics, Inc., includes such a port to support modular components. In the specific implementation of the invention exploits this modular feature to allow the master transceiver and data acquisition module 22 to be connected to the bus 71. This module is shown in more detail in FIG. 6 and comprises an extension 81 of the bus 71 via mating port 82. Connected to the bus extension 81 is an encoder/decoder 83 which provides outputs to a UART chip 84 that communicates via line drivers 85 to an appropriate interface. The interface in its simplest form may simply be either a parallel or serial wired connection 86. A serial connection is preferred in order to reduce bulk and size of the connection, and in a specific implementation is realized with a standard four wire modular telephone connection. Alternatively, the interface may be an infrared (IR) transceiver 87 or an RF transceiver 88, depending on the specific application.

Figure 7:
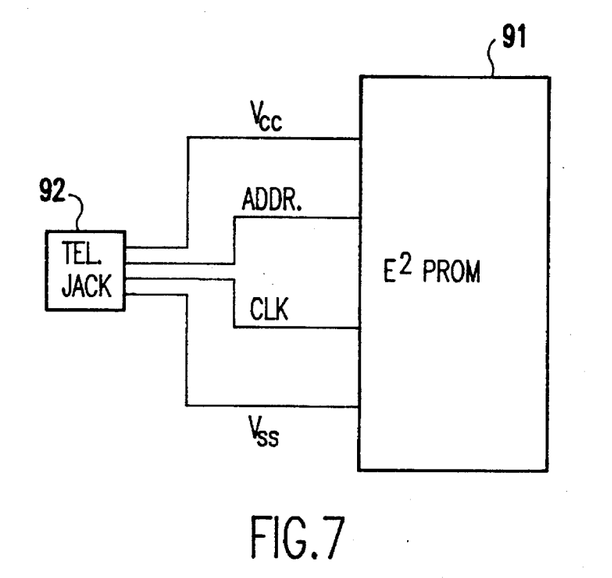
FIG. 7 is a block diagram of the slave transceiver and storage module used in the data acquisition and storage system shown in FIG. 2.

The slave transceiver and storage module is shown in FIG. 7 and, in its simplest form, comprises an $E^2$PROM 91 and an interface 92. If the interface in the master transceiver and data acquisition module is a modular four wire telephone connector, then the interface 92 is implemented with a similar connector. Otherwise, suitable IR or RF transceivers are used for the interface. The $E^2$PROM 91 may be, for example, a 2048×8 bit X24C16 integrated circuit (IC) chip manufactured by Xicor. If a four wire modular connector is used for example, the Xicor chip can be connected to receive $V_{cc}$, ground, address and clock signals from the master transceiver and data acquisition module.

The operation will now be described with reference to FIGS. 2, 5, 6, and 7. Measurements made by the test equipment 21 and stored in local memory., such as RAM 73, are read under control of microprocessor 72 to the master transceiver and data acquisition module 22. A communications connection is established between the master transceiver and data acquisition module 22 and the slave transceiver and storage module 23. The data is transferred via bus 72, bus extension 82, interfaces 86 and 92 to the memory 91. Later, when performing maintenance functions on the telecommunications system, the connection is reestablished between the master transceiver and data acquisition module 22 and the slave transceiver and storage module 23. The data in memory 91 is transferred via interfaces 92 and 86, bus extension 82, and bus 71 to the local memory 73, and the microprocessor 72 uses this data and data read by the test equipment 21 to compute and display the delta value. Thus, by providing archival information within the electronic equipment, troubleshooting and the reestablishment of system balance can be achieved with greater accuracy and time savings compared to current practices.

The implementation described contemplates a modular design in which the storage module is housed in the specific telecommunications electronic equipment for which data is archived. It is also possible in some applications to archive the data in a file server at a central location which is accessed via modem or cellular telephone, for example. In FIG. 1, one such central location might be the head-end 11 and the data for all equipment in the system is transmitted, with identifying addresses, on a periodic basis. In such a unidirectional transmission system, the technician would simply dial in the address of the equipment for which the data is required, and the instrument would simply read the data transmitted for that address. Other central locations could be intermediate hubs in the system, and the communication with the file server could be bidirectional using, for example, cellular telephone.

While the invention has been described in terms of a single preferred embodiment, those skilled in the art will recognize that the invention can be practiced with modification within the spirit and scope of the appended claims. For example, the master transceiver and data acquisition module could be provided with its own microprocessor to perform the data operations described, independently of the microprocessor 72 in the test equipment 21. Other modifications and variations will become apparent to those skilled in the art.

Having thus described my invention, what I claim as new and desire to secure by Letters Patent is as follows:

1. An electronic data acquisition and storage system for facilitating alignment and realignment of a component of a telecommunications system comprising:

a storage device attachable to the component;

a transceiver and data acquisition module connectable via a communications link to said storage device; and test equipment connectable to said transceiver and data acquisition module, said test equipment including a source of data defining operating parameters for said component, said data being accessed and transferred to said storage device for archival storage of said data defining operating parameters, said data being later accessible for purposes of facilitating alignment and realignment of the component, said transceiver being connectable to said storage device only for the purposes of storage and retrieval of said data, said storage device remaining attached to said component for future access for realignment of said component, and said transceiver and data acquisition module accessing the data defining operating parameters stored in said storage device and supplying the data to said test equipment.

2. The electronic data acquisition and storage system recited in claim 1 wherein said source of data defining operating parameters is memory in said test equipment, said data being read by said test equipment upon adjustment of the component to desired operating conditions.

3. The electronic data acquisition and storage system recited in claim 1 wherein said storage device are packaged as a module physically mounted in the component.

4. The electronic data acquisition and storage system recited in claim 3 wherein the test equipment is further connectable to read current operating data from the component and comprises:

local storage for temporarily storing the current operating data and the data defining operating parameters read from the storage device;

a microprocessor programmed to access the local storage and compute a difference between the current operating data and the data defining operating parameters read from the storage device; and a display controlled by the microprocessor to display the computed difference.

5. The electronic data acquisition and storage system recited in claim 1 wherein the test equipment further communicates with the storage device to read current operating data from the storage device and comprises:

local storage for temporarily storing the current operating data and the data defining operating parameters read from the storage device;

a microprocessor programmed to access the local storage and compute a difference between the current operating data and the data defining operating parameters read from the storage device; and a display controlled by the microprocessor to display the computed difference.

6. A method of acquiring and archival storing of operation data for a component in a telecommunications system comprising the steps of:

providing a storage device attachable to the component;

connecting a transceiver and data acquisition module to said storage device via communication link;

connecting test equipment to said transceiver and data acquisition module;

supplying data defining operating parameters accessed by said transceiver from said storage device to said test equipment; and accessing a source of data stored in said test equipment defining operating parameters for said component by said transceiver and data acquisition module and transferring the data to said storage device for archival storage of said data defining operating parameters, said data being later accessible for purposes of facilitating alignment and realignment of the telecommunications equipment, said storage device remaining attached to said component for future access for realignment of said component, and said transceiver being connectable to said storage device only for the purposes of storage and retrieval of said data.

7. The method recited in claim 6 wherein the step of providing is performed by physically mounting a slave transceiver and storage module in the telecommunications equipment.

8. The method recited in claim 6 further comprising the step of reading by said test equipment said data upon adjustment of the component to desired operating conditions.

9. The method recited in claim 6 wherein the test equipment is further connectable to read current operating data from the component, said method further comprising the steps of:

storing in local storage of said test equipment the current operating data and the data defining operating parameters read from the storage module;

computing with a microprocessor in the test equipment programmed to access the local storage a difference between the current operating data and the data defining operating parameters read from the storage device; and displaying the difference computed by the microprocessor.

* * * * *